US007295997B2

(12) United States Patent
Estes et al.

(10) Patent No.: US 7,295,997 B2
(45) Date of Patent: Nov. 13, 2007

(54) METHOD FOR SHIPPING A PACKAGE PRIVATELY TO A CUSTOMER

(75) Inventors: Jacquelyn Estes, Warrenton, VA (US); Wayne H. Orbke, Germantown, TN (US); Maria C. Penn, Alexandria, VA (US); Phillip A. Pensabene, Huntongtown, MD (US); Christine R. L. Ray, Washington, DC (US); Julie F. Rios, Washington, DC (US); Jacquelyn M. Robinson, Washington, DC (US); Kerry J. Troxel, Bowie, MD (US)

(73) Assignee: United States of America Postal Service, Washington, DC (US)

( * ) Notice: Subject to any disclaimer, the term of this patent is extended or adjusted under 35 U.S.C. 154(b) by 520 days.

(21) Appl. No.: 10/311,748

(22) PCT Filed: Jun. 19, 2001

(86) PCT No.: PCT/US01/19384

§ 371 (c)(1),
(2), (4) Date: Dec. 19, 2002

(87) PCT Pub. No.: WO01/99005

PCT Pub. Date: Dec. 27, 2001

(65) Prior Publication Data

US 2003/0208411 A1  Nov. 6, 2003

Related U.S. Application Data

(60) Provisional application No. 60/232,430, filed on Sep. 14, 2000, provisional application No. 60/212,596, filed on Jun. 19, 2000.

(51) Int. Cl.
*G06Q 30/00* (2006.01)
*G06F 17/30* (2006.01)

(52) U.S. Cl. .............................. 705/26; 705/1; 705/27; 705/50; 705/74

(58) Field of Classification Search ............ 705/26–27, 705/1, 60–62, 74, 50
See application file for complete search history.

(56) References Cited

U.S. PATENT DOCUMENTS 4,135,662 A    1/1979   Dlugos (Continued)

FOREIGN PATENT DOCUMENTS

EP        0 516 898 A1    12/1992

(Continued)

OTHER PUBLICATIONS

"Export management firms procide alternatives". Anonymous. Carin's Chicago Business. Chicago: Dec. 12, 1983. vol. 6, Iss. 50; p. 17 [retrieved from ProQuest Dec. 19, 2005].*

(Continued)

*Primary Examiner*—Matthew S. Gart
*Assistant Examiner*—William J. Allen
(74) *Attorney, Agent, or Firm*—Finnegan, Henderson, Farabow, Garrett & Dunner L.L.P.

(57) ABSTRACT

Methods and systems consistent with the present invention facilitate in sending a package (112) to a customer at a physical address via a shipper (106) while preserving customer privacy. In accordance with an embodiment, an order is received from the customer (102). The order may include a unique identifier corresponding to the customer. A package (110) is sent to the shipper (106) in fulfillment of the order, the package including the unique identifier. Then, the customer's physical address is derived from the unique identifier and the package is delivered (112) from the shipper to the customer's physical address.

12 Claims, 7 Drawing Sheets

U.S. PATENT DOCUMENTS

| | | | |
|---|---|---|---|
| 4,309,569 A | 1/1982 | Merkle | |
| 4,574,352 A | 3/1986 | Coppola et al. | |
| 4,725,718 A | 2/1988 | Sansone et al. | |
| 4,727,368 A | 2/1988 | Larson et al. | |
| 4,816,824 A * | 3/1989 | Katz et al. | 340/5.86 |
| 5,043,908 A | 8/1991 | Manduley et al. | |
| 5,136,646 A | 8/1992 | Haber et al. | |
| 5,136,647 A | 8/1992 | Haber et al. | |
| 5,223,829 A | 6/1993 | Watabe | |
| 5,373,561 A | 12/1994 | Haber et al. | |
| 5,404,231 A | 4/1995 | Bloomfield | |
| RE34,954 E | 5/1995 | Haber et al. | |
| 5,631,827 A * | 5/1997 | Nicholls et al. | 705/28 |
| 5,638,446 A | 6/1997 | Rubin | |
| 5,701,770 A | 12/1997 | Cook et al. | |
| 5,710,887 A | 1/1998 | Chelliah et al. | |
| 5,729,594 A | 3/1998 | Klingman | |
| 5,774,053 A | 6/1998 | Porter | |
| 5,781,629 A | 7/1998 | Haber et al. | |
| 5,857,188 A | 1/1999 | Douglas | |
| 5,870,549 A | 2/1999 | Bobo | |
| 5,878,233 A | 3/1999 | Schloss | |
| 5,917,411 A | 6/1999 | Baggarly | |
| 5,917,925 A | 6/1999 | Moore | |
| 5,943,656 A | 8/1999 | Crooks et al. | |
| 5,971,587 A | 10/1999 | Kato et al. | |
| 5,979,750 A | 11/1999 | Kindell | |
| 6,006,200 A * | 12/1999 | Boies et al. | 705/26 |
| 6,028,517 A | 2/2000 | Sansone et al. | |
| 6,035,402 A | 3/2000 | Vaeth et al. | |
| 6,047,264 A | 4/2000 | Fisher et al. | |
| 6,064,995 A | 5/2000 | Sansone et al. | |
| 6,070,798 A * | 6/2000 | Nethery | 235/462.01 |
| 6,138,910 A | 10/2000 | Madruga | |
| 6,152,369 A | 11/2000 | Wilz et al. | |
| 6,219,669 B1 | 4/2001 | Haff et al. | |
| 6,233,565 B1 | 5/2001 | Lewis et al. | |
| 6,243,620 B1 | 6/2001 | Robinson et al. | |
| 6,246,925 B1 | 6/2001 | Robinson et al. | |
| 6,259,964 B1 | 7/2001 | Robinson | |
| 6,285,991 B1 | 9/2001 | Powar | |
| 6,289,323 B1 | 9/2001 | Gordon et al. | |
| 6,323,782 B1 | 11/2001 | Stephens et al. | |
| 6,347,737 B1 | 2/2002 | Madruga | |
| 6,442,571 B1 | 8/2002 | Haff et al. | |
| 6,446,045 B1 | 9/2002 | Stone et al. | |
| 2001/0032181 A1 | 10/2001 | Jakstadt et al. | |
| 2001/0044785 A1* | 11/2001 | Stolfo et al. | 705/74 |
| 2002/0049672 A1 | 4/2002 | Kitchen et al. | |
| 2003/0023561 A1* | 1/2003 | Stefik et al. | 705/51 |
| 2003/0077409 A1 | 4/2003 | Schnell | |
| 2004/0002903 A1* | 1/2004 | Stolfo et al. | 705/26 |
| 2005/0033659 A1* | 2/2005 | Zucker et al. | 705/26 |

FOREIGN PATENT DOCUMENTS

| | | |
|---|---|---|
| WO | WO 97/12460 | 4/1997 |
| WO | WO 99/66428 * | 12/1999 |
| WO | WO 00/13368 | 3/2000 |
| WO | WO 01/00069 A2 | 1/2001 |
| WO | WO 01/18718 A1 | 3/2001 |
| WO | WO 01/65444 A1 | 9/2001 |
| WO | WO 01/99009 A2 | 12/2001 |
| WO | WO 01/99037 A1 | 12/2001 |
| WO | WO 02/08961 A1 | 1/2002 |
| WO | WO 02/21315 A1 | 3/2002 |
| WO | WO 02/066344 A1 | 8/2002 |
| WO | WO 02/079947 A2 | 10/2002 |
| WO | WO 03/023677 A1 | 3/2003 |

OTHER PUBLICATIONS

"Faster Freight: couriers and expedited carriers broaden their approach to better serve Canadian shippers". Materials Management and Distribution. Toronto: Oct. 1996, vol. 41, Iss. 10; p. 34 [retrieved from ProQuest Dec. 19, 2005].*

"A new look for MSDS". Campbell, Sharon Lynn, Occupational Health and Safety. Waco: Jun 1992. vol. 61, Iss. 6; p. 62 [retrieved from ProQuest Dec. 19, 2005].*

"American express invests in Respond.com" M2 Presswire. Mar. 9, 2000. [recovered from Dialog database on May 16, 2007].*

"Purchasing tools for the Internet toolbox". Carbone, Jim. Purchasing, vol. 123. Dec. 11, 1997. [recovered from Dialog database on May 16, 2007].*

Campbell et al., "Systems and Methods for Authenticating an Electronic Message," Pending U.S. Appl. No. 09/675,667, filed Sep. 29, 2000.

Campbell et al., "Methods and Systems for Proofing Identities Using a Certificate Authority," Pending U.S. Appl. No. 09/809,325, filed Mar. 16, 2001.

Orbke et al., "Methods and Systems for Establishing and Electronic Account for a Customer," Pending U.S. Appl. No. 09/809,328, filed Mar. 16, 2001.

Cook et al., "Methods and Systems for Providing a Secure Electronic Mailbox," Pending U.S. Appl. No. 09/809,312, filed Mar. 16, 2001.

Campbell et al., "Methods and Systems for Providing an Electronic Account to a Customer," Pending U.S. Appl. No. 09/809,581, filed Mar. 16, 2001.

Cook et al., "Methods and Systems for Linking an Electronic Address to a Physical Address of a Customer," Pending U.S. Appl. No. 09/809,326, filed Mar. 16, 2001.

Krause et al., "Systems and Methods for Electronic Message Content Identification," Pending U.S. Appl. No. 10/311,743, corresponding to international application No. PCT/US01/19698, international filing date: Jun. 20, 2001 (specification provided as WO 01/99009 A2).

Replacement Sheet for p. 1 of international application No. PCT/US01/19698 (published as WO 01/99009 A2) submitted to U.S. Patent and Trademark Office, Box PCT, on Jan. 18, 2002.

Buie et al., "Systems and Methods for Providing Mail Item Retrieval," Pending U.S. Appl. No. 10/311,742, corresponding to international appplication No. PCT/US01/19421, international filing date: Jun. 19, 2001 (specification provided as WO 01/99037 A1).

Sadler et al., "Item Attribute Preverfication," Pending U.S. Appl. No. 10/333,841, corresponding to international application No. PCT/US01/23177, international filing date: Jul. 24, 2001(specification provided as WO 02/08961 A).

Campbell, "Systems and Methods for Providing Electronic Archiving," Pending U.S. Appl. No. 10/362,506, corresponding to international application No. PCT/US01/27690, international filing date: Sep. 7, 2001 (specification provided as WO 02/21315 A1).

Aldstadt, "Item Tracking and Anticipated Delivery Confirmation System Method," Pending U.S. Appl. No. 10/488,762, corresponding to international application No. PCT/US01/28001, international filng data: Sep. 7, 2001 (specification provided as WO 03/023677 A1).

Devar, "Universal Delivery and Collection Box Unit (UDCBU)," Pending U.S. Appl. No. 10/468,364, corresponding to international application No. PCT/US02/04866, international filing date: Feb. 20, 2002 (specification provided as WO 02/066344 A1).

Devar, "Universal Delivery and Collection Box Unit," Pending U.S. Appl. No. 10/473,873, corresponding to international application No. PCT/US02/09870, international filing date: Apr. 2, 2002 (specification provided as WO 02/079947 A2).

International Search Report, PCT/US00/27068, mailed May 4, 2001 (4 pages).

International Search Report in PCT/US01/23177, mailed Oct. 18, 2001 (4 pages).

International Search Report in PCT/US01/19384, mailed Nov. 16, 2001 (6 pages).

International Search Report in PCT/US01/19421, mailed Nov. 19, 2001 (6 pages).
International Search Report in PCT/US01/27690, mailed Nov. 19, 2001 (5 pages).
International Search Report in PCT/US01/28001, mailed Dec. 21, 2001 (7 pages).
International Search Report in PCT/US01/08490, mailed Jan. 22, 2002 (6 pages).
International Search Report in PCT/US02/04866, mailed May 23, 2002 (1 page).
International Search Report in PCT/US02/09870, mailed Dec. 5, 2002 (2 pages).
International Preliminary Examination Report in PCT/US01/08487, mailed Jan. 23, 2002 (4 pages).
International Preliminary Examination Report in PCT/US01/23177, mailed May 3, 2002 (4 pages).
International Preliminary Examination Report in PCT/US01/19421, mailed May 16, 2002 (4 pages).
International Preliminary Examination Report in PCT/US01/19384, mailed Jan. 17, 2003 (4 pages).
International Preliminary Examination Report in PCT/US01/08488, mailed Jun. 11, 2003 (10 pages).
International Preliminary Examination Report in PCT/US01/28001, mailed Aug. 8, 2003 (4 pages).
PCT Written Opinion (PCT Rule 66) in PCT/US01/19384, mailed Jun. 17, 2002 (4 pages).
PCT Written Opinion (PCT Rule 66) in PCT/US01/08488, mailed Oct. 28, 2002 (9 pages).
PCT Written Opinion (PCT Rule 66) in PCT/US02/09870, mailed Mar. 6, 2003 (5 pages).
PCT Written Opinion (PCT Rule 66) in PCT/US02/04866, mailed May 23, 2003 (4 pages).
Appendix K (USPS Burke Test Site Report), "User Interface Review of Mail Item Retrieval System (MIRS), Burke Station, Burke Virginia" (Dec. 24, 1998); appendix of USPS Mail Item Retrieval System (MIRS) Phase 2 Limited Production Self-Service Statement of Work (SOW) (SOW can be found in U.S. Appl. No. 60/255,407, filed Dec. 15, 2000, which is incorporated by reference into Pending U.S. Appl. No. 10/311,742, filed Dec. 19, 2002).
Appendix L, "In-plant Test Report (Re-Test Failed Items), Mail Item Retrieval System (MIRS)" (Oct. 21, 1998); appendix of USPS Mail Item Retrieval System (MIRS) Phase 2 Limited Production Self-Service Statement of Work (SOW) (SOW can be found in U.S. Appl. No. 60/255,407, filed Dec. 15, 2000, which is incorporated by reference into Pending U.S. Appl. No. 10/311,742, filed Dec. 19, 2002).

Appendix M, "Heuristic Evaluation of the USPS Mail Item Retrieval System Early Prototype," by R. Hoffman and E. Nelson, Mitretek Systems (May 11, 1998); appendix of USPS Mail Item Retrieval System (MIRS) Phase 2 Limited Production Self-Service Statement of Work (SOW) (SOW can be found in U.S. Appl. No. 60/255,407, filed Dec. 15, 2000, which is incorporated by reference into Pending U.S. Appl. No. 10/311,742, filed Dec. 19, 2002).
Bartholomew, D., "The Future of Snail Mail: the Postal Service Is Gearing up for Competition. But Can It Deliver?," InformationWeek, Dec. 4, 1995, starting p. 34, retrieved from Dialog, Dialog No. 08306634 (6 pages).
Bhushan, B. et al., "Federated Accounting: Service Charging and Billing in a Business-to-Business Environment," 2001 IEEE/IFIP International Symposium, May 14-18, 2001, pp. 107-121.
"CONNECT announces OneServer interactive online application platform," Business Wire, Apr. 10, 1995, p. 4101043, retrieved from Dialog, Dialog No. 07797909 (2 pages).
Czerny, M., "Customer Account Management System for STEWEAG Key Accounts," CIRED 97 Conference Publication No. 438, Jun. 2-5, 1997, pp. 5.6.1 to 5.6.5.
eBusiness Tools, FedEx™ Ship Manager Software [online], pp. 1-2, FedEx™ [retrieved on Nov. 28, 2001]. Retrieved from the Internet: <URL: www.fedex.com/us/ebusiness/eshipping/ship.html>.
Fast Facts, Back Issue [online], pp. 1-4, FedEx™ Oct. 11, 2000 [retrieved on Nov. 28, 2001]. Retrieved from the Internet: <URL: www.fedex.com/us/customer/fastfacts/backissues/101100fastfacts.html>.
"Joint Direct Bill Payment Form for Mich. Utilities," Bank Technology News, Apr. 1994, p. 8, retrieved from Dialog, Dialog No. 03302326 (1 page).
Newkirk, K.M., "Banks Can Slice Transaction Costs," Independent Banker, Dec. 1995, vol. 45, No. 12, pp. 52-53, retrieved from Dialog, Dialog No. 00276769 (3 pages).
Selected pp. (9-11, 18-19, 28-32) from "Recommendation F.400/X.400 Message Handling and Directory Services—Operation and Definition of Service," Nov. 14, 1988, CCITT, Melbourne, XP002186347 (10 pages).
Stafford, C.D. et al., "Delivering Marketing Expertise to the Front Lines," IEEE Expert, Apr. 1994, pp. 23-32.

* cited by examiner

METHOD FOR SHIPPING A PACKAGE PRIVATELY TO A CUSTOMER

RELATED APPLICATIONS

This application claims the benefit of U.S. Provisional Patent Application No. 60/212,596, filed Jun. 19, 2000, and U.S. Provisional Patent Application No. 60/232,430, filed Sep. 14, 2000. The contents of the two aforesaid applications are hereby incorporated by reference.

DESCRIPTION OF THE INVENTION

1. Field of the Invention

The present invention relates generally to shipping a package to a customer and, more particularly, to a system, method, and article of manufacture for shipping a package privately to a customer, so that the sender does not learn the recipient's identity.

2. Background Information

In recent years, online networks, such as the Internet, have experienced explosive growth and success because they provide a user (e.g., a customer) with the ability to access a vast array of resources (e.g., information) and to buy a product remotely (e.g., from the user's home). The Internet and more specifically, the World Wide Web ("Web") is a distributed network that includes web servers and web clients. Web servers are software applications that support common protocols, such as Hypertext Transport Protocol (HTTP). Moreover, these web servers make documents, such as documents in hypertext mark up language (HTML), and other resources available to users via web sites. Each web site may include a plurality of web pages and may be identified by a unique address called a Uniform Resource Locator (URL). Web clients include software applications, such as a browser, which a user uses to access a web page, for example.

As a result of the Internet, many merchants who have a physical presence (e.g., a store in a mall) also have created web sites to sell the products they offer over the Internet. In addition, many new merchants have created web sites to sell their products only over the Internet and not in a physical store. To buy a product from these merchants, a customer may visit the merchant's web site, select the products that the customer wants to buy, and provide certain information (e.g., name, address, and financial information) to the merchant. After the merchant verifies the customer's information, the merchant may send the product to the customer via a shipper (e.g., United States Postal Service (USPS), Federal Express, and United Postal Service (UPS)).

To provide convenience to the customer, some web sites also create accounts for their customers so that the customers do not have to reenter their information every time the customers shop with that merchant. The merchant also may assign a user name and/or password, for example, to each customer who opens an account with them. Then, instead of providing their information every time, the customer may only need to provide a user name and/or password, for example, to logon to the merchant web site and to purchase products from the merchant.

Despite the convenience and advantages provided by such web sites, there are several drawbacks. One drawback is that many customers are hesitant in providing their personal information (e.g., name and address) to merchants because they are afraid that unknown third parties may intercept their personal information en route or that the merchant may sell their information to unknown third parties. Such customers may want to remain anonymous, either entirely or partially.

In addition, many customers may not want to receive unwanted offers (e.g., sales calls or literature) from merchants who send such offers to customers after a customer has purchased a product from the merchant.

Furthermore, if a merchant web site does not create an account for a customer, the customer may need to reenter his or her personal information each time the customer visits the merchant web site, a task that may be time consuming and inconvenient. On the other hand, if a merchant web site does create an account for a customer, the customer may not remember the logon information (e.g., user name and password) that the merchant assigned to the customer when the customer initially established the account with the merchant. To remember the logon information, some customers may write the logon information on a piece of paper. This can result in unauthorized persons obtaining the information necessary to make unauthorized purchases on the customer's account.

Moreover, with the increase in the number of merchants offering products on the Internet, establishing accounts with each merchant that the customer purchases products from may be a time consuming and inconvenient task

SUMMARY OF A FEW ASPECTS OF THE INVENTION

Methods and systems consistent with the present invention facilitate in sending a package to a customer at a physical address via a shipper while preserving customer privacy. In accordance with an embodiment, an order is received from the customer. The order may include a unique identifier corresponding to the customer. A package is sent to the shipper in fulfillment of the order, the package including the unique identifier. Then, the customer's physical address is derived from the unique identifier and the package is delivered from the shipper to the customer's physical address. The unique identifier may be the customer's account number, a random number, or a barcode.

Methods and systems consistent with present invention may include a merchant computer, shipping computer, and payment computer to ship a package privately to the customer. The merchant computer may receive a purchase request for a product from a customer. The merchant computer may in turn send to a payment computer, an electronic token corresponding to a customer account and a purchase amount corresponding to the purchase request. In addition, a validation request to verify the electronic token may be sent to a shipping computer. The shipping computer may verify the electronic token. After verification, the electronic token is converted into shipping label information, wherein the shipping label information includes neither a name nor the physical address of the recipient. The shipping label information is then sent to the merchant computer. In addition, a first label with the shipping label information is printed at the merchant computer. The first label is affixed to the package containing the product and the package is sent to the shipper. The shipper retrieves a name and a physical address of the customer using the shipping label information, places a second label that includes the name and physical address on the package, and delivers the package to the customer.

Both the foregoing and the following description are exemplary and explanatory and are intended to provide further explanation of the claimed invention as opposed to limiting it in any manner.

BRIEF DESCRIPTION OF THE DRAWINGS

The accompanying drawings are incorporated in and constitute a part of this specification, and together with the description, explain the principles of the invention. In the drawings.

DETAILED DESCRIPTION

Figure 1:
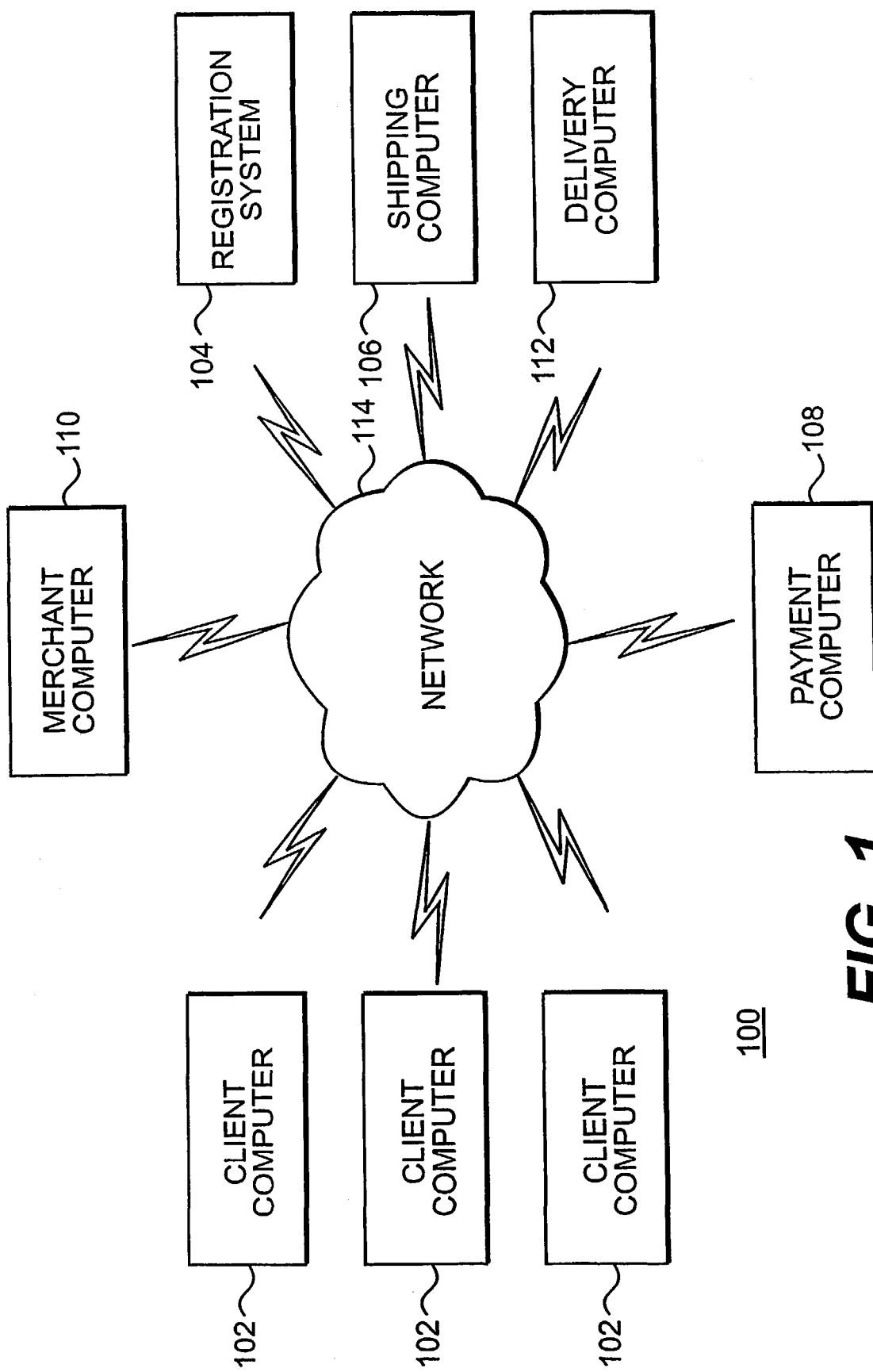
FIG. 1 is a block diagram of an exemplary system consistent with the present invention.

The following detailed description of the invention refers to the accompanying drawings. While the description includes exemplary embodiments, other embodiments are possible and changes may be made to the embodiments described without departing from the spirit and scope of the invention. The following detailed description does not limit the invention. Instead, the appended claims and their equivalents define the scope of the invention.

Methods and systems consistent with the present invention provide an electronic account to each customer on a network. In accordance with an embodiment of the present invention, a customer may use a registration system to establish an account with a shipper (e.g., USPS). To establish an account, the customer may provide the required information (e.g., name, address, and financial information) to the registration system.

Moreover, during account establishment, the shipper may assign logon information (e.g., logon information) and provide a digital certificate to the customer. In addition, during account establishment, if the customer does not already have an account with the payment company, the customer may also establish an account with a payment company. Then, when the customer wants to purchase a product from a merchant's web site, the customer may logon to a network (e.g., the Internet) using his or her computer. Using the browser on his computer, the customer may visit the shipper's web site to obtain an electronic token. To establish the customer's identity, the shipper's web site may prompt the customer for the logon information and the digital certificate, both of which were provided to the customer during account establishment.

After obtaining the token, the customer may visit the merchant's web site and select the product that the customer wants to purchase. Once the customer has selected the product, the merchant website may redirect the customer's browser to the payment company's web site along with the electronic token and transaction information (e.g., total purchase amount).

The payment company's web site may, in turn, send the electronic token to the shipper's web site for validation. Once the shipper's web site has verified the token, the shipper's web site may provide validation and information for a shipping label to the payment company's web site. This label information may include a unique identifier, for example, a random number or a barcode, to identify the customer, but may not include the customer's name or address information. Upon receiving the verification and label information, the payment company's web site may charge the customer's account for the amount of the transaction and provide the label information to the merchant. The merchant may in turn print the label information on a label, affix the label to a package, and send the package to the shipper.

Once the shipper receives the package, the shipper may read or scan the label to determine the customer's name and address, apply a new label that has the customer's name and address to the package, and ship the package to the customer. Accordingly, in this embodiment, the customer's information remains anonymous from the merchant.

FIG. 1 is a block diagram of an exemplary system 100 consistent with the present invention. System 100 may include one or more client computers 102, a registration system 104, a shipping computer 106, a payment computer 108, a merchant computer 110, and a delivery computer 112, all of which may be interconnected via a network 114.

Each client computer 102 may include a computer or any other processor capable of communicating with other computers (e.g., merchant computer 110) and displaying information. The client computer may be located at a customer's home.

Registration system 104 may include one or more computers capable of communicating with other computers (e.g., merchant computer 110) and displaying information. Registration system 104 may obtain personal information (e.g., name, address, financial information) to establish an account for a customer and may assign an account number to the customer. Registration system 104 also may assign logon information (e.g., user name and/or password) to a customer. In addition, registration system 104 may be connected to a certificate authority so that a digital certificate can be provided to a customer upon account establishment.

Registration system 104 may also send customer's information to shipping computer 106 and payment computer 108. Moreover, in one embodiment, registration system 104 may create an electronic token for a customer. An electronic token may be an encrypted data structure, customer's account number, or a random number. The electronic token may have certain options associated with it to provide security. For example, the electronic token may only be used a certain number of times or for a certain amount of time before it expires. Registration system 104 maybe owned and/or maintained by a shipper.

In accordance with an embodiment of the present invention, registration system 104 maybe the registration system disclosed in U.S. patent application Ser. No. 09/809,328 ("'328 application"), filed Mar. 16, 2001, which is hereby incorporated by reference.

Shipping computer 106 may include a computer or any other processor capable of communicating with other computers (e.g., payment computer 108) and displaying information. Shipping computer 106 may receive customer information from registration system 104. In addition, shipping computer 106 may generate an electronic token for a customer and validate the electronic token for a payment company.

Shipping computer 106 may also provide shipping label information that is placed on a package by a merchant. The shipping label information may include, for example, a random number, a customer's account number, or a barcode associated with a customer, so that the customer's identity remains hidden from the merchant. In one embodiment, the barcode associated with the customer may include three digits to identify the zone of the delivery address for zone pricing purposes. In another embodiment, the shipping label information may also include a barcode representation or a number representation of the re-labeling location.

Shipping computer 106 also may provide delivery label information to delivery computer 112 so that a package received from a merchant may be delivered to a customer. The delivery label information may include, for example, a customer's name and address. Shipping computer 106 also may be owned and/or maintained by a shipper.

Payment computer 108 may include a computer or any other processor capable of communicating with other computers (e.g., merchant computer 110) and displaying information. Payment computer 108 may receive a transaction from a merchant computer 110, may charge the customer's account for the amount of the transaction, and provide the merchant with payment confirmation. In addition, payment computer 108 may send a customer's electronic token to shipping computer 106 for validation. In one embodiment, payment computer 108 may receive a validation of the customer's electronic token along with shipping label information from shipping computer 106 and may send the shipping label information to merchant computer 110. In another embodiment, payment computer 108 may receive a validation of the customer's electronic token from shipping computer 106, generate shipping label information, and may send the shipping label information to merchant computer 110. In this embodiment, payment computer 108 may also send the shipping label information to shipping computer 106 so that the shipping label information may be converted to delivery label information.

Payment computer 108 maybe owned and/or maintained by a financial institution (e.g., American Express and other credit card companies) or any company that provides a customer with the ability to mask his or her real identity from a merchant.

Merchant computer 110 may include a computer or any other processor capable of communicating with other computers (e.g., payment computer 108) and displaying information. Merchant computer 110 may offer products to a customer via network 114 and client computer 102. After a customer selects the product(s) he or she wants to purchase, merchant computer may send the customer's transaction information (e.g., purchase amount for the product(s)) and electronic token to payment computer 108 for processing. In addition, a merchant may use merchant computer 110 to receive shipping label information from payment computer 108, print a label with the shipping label information, affix the label to a package containing the product purchased by the customer, and send the package to a shipper for delivery to the customer.

Delivery computer 112 may include a computer or any other processor capable of communicating with other computers (e.g., shipping computer 106) and displaying information. Upon receipt of a package from a merchant, the shipper may use delivery computer 112 to read the shipping label information affixed on the package and request the delivery label information from shipping computer 106. Once the delivery label information is received from the shipping computer 106, the shipper may print a label with the delivery label information, affix the label to the package, and deliver the package to the customer. Delivery computer 112 may be owned and/or operated by the shipper or a third party.

Network 114 may be a single or a combination of any type of computer network, such as a Local Area Network (LAN) or a Wide Area Network (WAN). For example, network 114 may comprise an Ethernet network operating according to the IEEE 802.3 standard. In addition, network 114 may be a combination of public (e.g., Internet) and private networks. For example, client computer 102, payment computer 108, and merchant computer 110 may be connected to each other and to registration system 104, shipping computer 106, and delivery computer 112 via the Internet. However, registration system 104, shipping computer 106, and delivery computer 112 may be connected to each other via a LAN.

Other system and network configurations will be apparent to those skilled in the art from the foregoing and following description, and thus, are also within the scope of the present invention. For example, it will be apparent to one skilled in the art that a single computer may perform the tasks performed by registration system 104, shipping computer 106, and delivery computer 112. Similarly, it will be apparent to one skilled in the art that system 100 may include multiple shipping computers 106, payment computers 108, merchant computers 110, and delivery computers 112.

Figure 2:
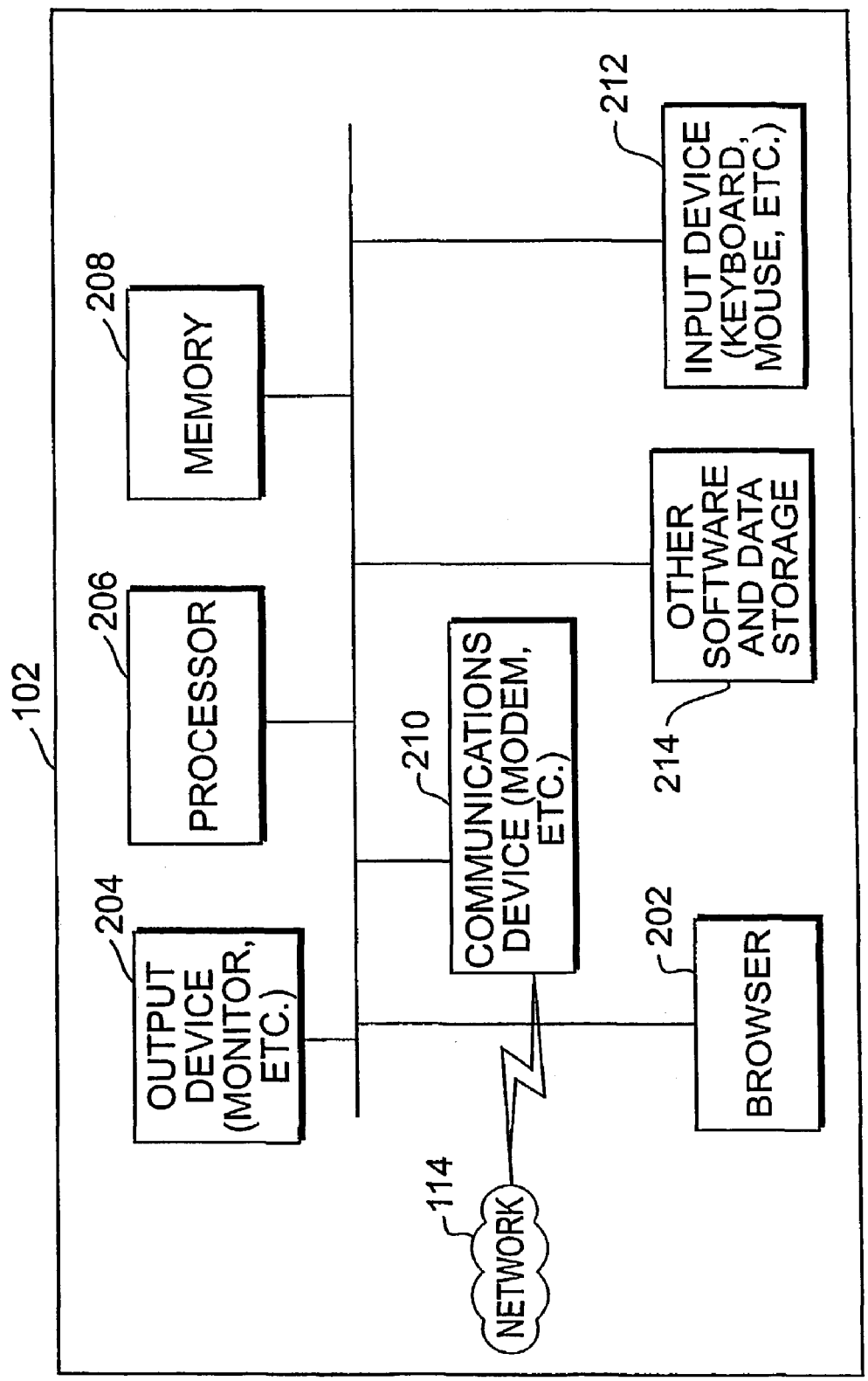
FIG. 2 is a block diagram of an exemplary client computer consistent with the present invention.

FIG. 2 is a block diagram of an exemplary client computer 102 consistent with the present invention. As shown, client computer 102 may include browser 202, output device 204, processor 206, memory 208, communications device 210, input device 212, and other software and data storage 214.

Browser 202 may include a conventional software application, such as NETSCAPE NAVIGATOR or INTERNET EXPLORER, for issuing HTTP requests to other computers (e.g., merchant computer 110). For example, browser 202 may request a specific web page or ask other computers (e.g., merchant computer 110) to perform a database query. Browser 202 also may read HTML codes embedded in the web pages received from the various servers to determine how, where, and in what colors and fonts the elements on the web pages must be displayed. In another embodiment, if cellular phones, are used as client computers 102, a WAP-compatible micro-browser may be used as the browser 202. In still another embodiment, encryption capability may be included in browser 202.

Output device 204 may include a device that displays information to users. In addition, client computer 102 also may include processor 206 and/or memory 208. The processor 206 may control the components of client computer 102 and assist in processing requests received from other components. The memory 208 may include ROM (Read Only Memory) and/or RAM (Random Access Memory).

Client computer 102 also may include communications device 210 that may include an interface device for transmitting information from client computer 102 to network 110 and for receiving information that is addressed to client computer 102 from network 114. For example, communications device 210 may be a network interface card or a modem. In one embodiment, when sending information, communications device 210 may break the information into packets that are sent across a TCP/IP network 110 to the various servers. In addition, communications device 210 may check for errors in transmission using, for example, cyclical redundancy check ("CRC").

Input device 212 may include a device that is used for receiving input from a user. For example, input device 212 may include a keyboard, a keypad, and/or a pointing device (e.g., a mouse or a trackball). A keypad may comprise a conventional alphanumeric or numeric key entry device. Client computer 102 also may include other software and data storage 214, such as an operating system.

It will be apparent to one skilled in the art that client computer 102 may include some or all the components shown in FIG. 2. Moreover, it will be apparent to one skilled in the art that on-site client computer 102 may include additional components not shown in FIG. 2. For example, client computer 102 may include a printer device to print, for example, information received from other computers.

Figure 3:
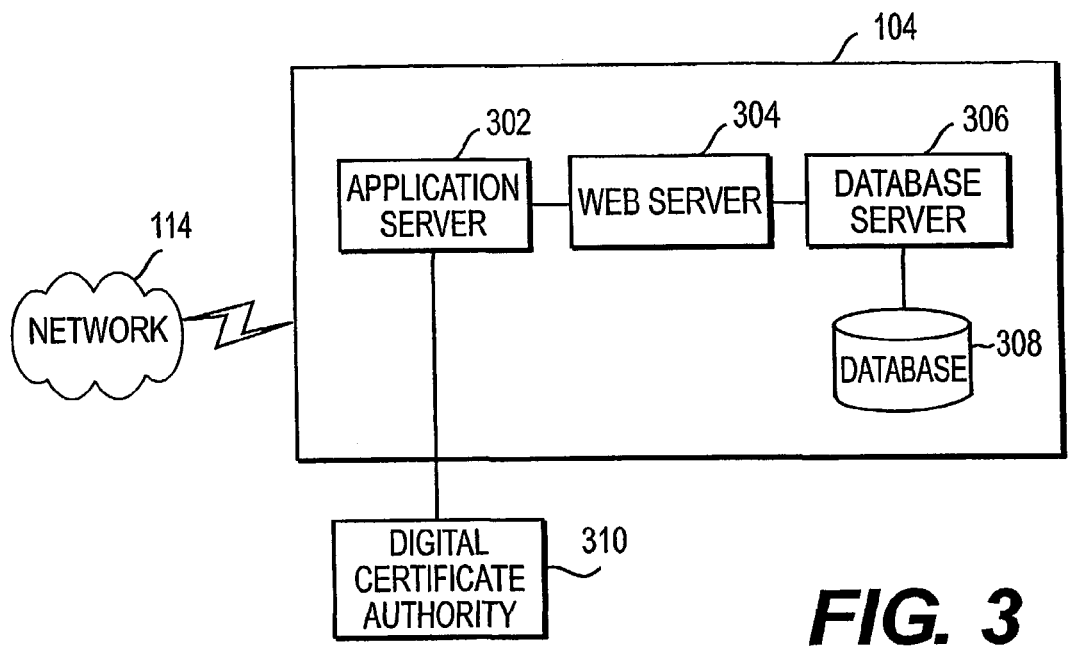
FIG. 3 is a block diagram of an exemplary registration system consistent with the present invention.

FIG. 3 is a block diagram of an exemplary registration system 104 consistent with the present invention. As shown, registration system 104 may include an application server 302, a web server 304, a database server 306, and a database 308. Registration system 104 also may be connected a digital certificate authority 310 for additional security.

Application server 302 may include software tools to generate dynamic content and execute applications for registration system 104. For example, application server 302 may include software that processes logic and instructions to support registration system 104, token generation and validation software to generate an electronic token for a customer, account number generator software to generate an electronic account number for a customer, and certificate software to construct and submit requests to digital certificate authority 310 and to retrieve customer's digital certificate from digital certificate authority 310.

Web server 304 may process HTML requests to enable communications with other computers (e.g., customer computer 102) and may provide data to application server 302 and database server 306. Database server 306 may process all communications with database 308. Database 308 may store customer information provided by the customer during registration.

As shown in FIG. 3, registration system 104 also maybe connected a digital certificate authority (CA) 310. During registration, registration system 104 may request digital certificate authority 310 to generate a digital certificate for a customer. The request may include, for example, a public key and information provided by customer during registration process.

The certificate authority 310 may issue an encrypted digital certificate containing a customer's public key and a variety of other identification information. The digital certificate can be, for example, a well-known CCITT X.500 Section 509 Version 3 certificate. The certification authority 310 may make its own public key available through print or perhaps on the Internet. The recipient of an encrypted message may use the CA's public key to decode the digital certificate attached to the message, verify the digital certificate as issued by the certificate authority 310, and then obtain the sender's public key and identification information held within the certificate. With this information, the recipient can send an encrypted reply.

Although not shown, it will be apparent to one skilled in the art that registration system 104 may include one or more computers that include a processor, memory, a communications device (e.g., network interface card), an output device (e.g., monitor), input device (e.g., keyboard and pointing device), and network operating system. The network operating system may process requests received from other computers, monitor network hardware and software, coordinate communication in the network, and provide transaction security.

Figure 4:
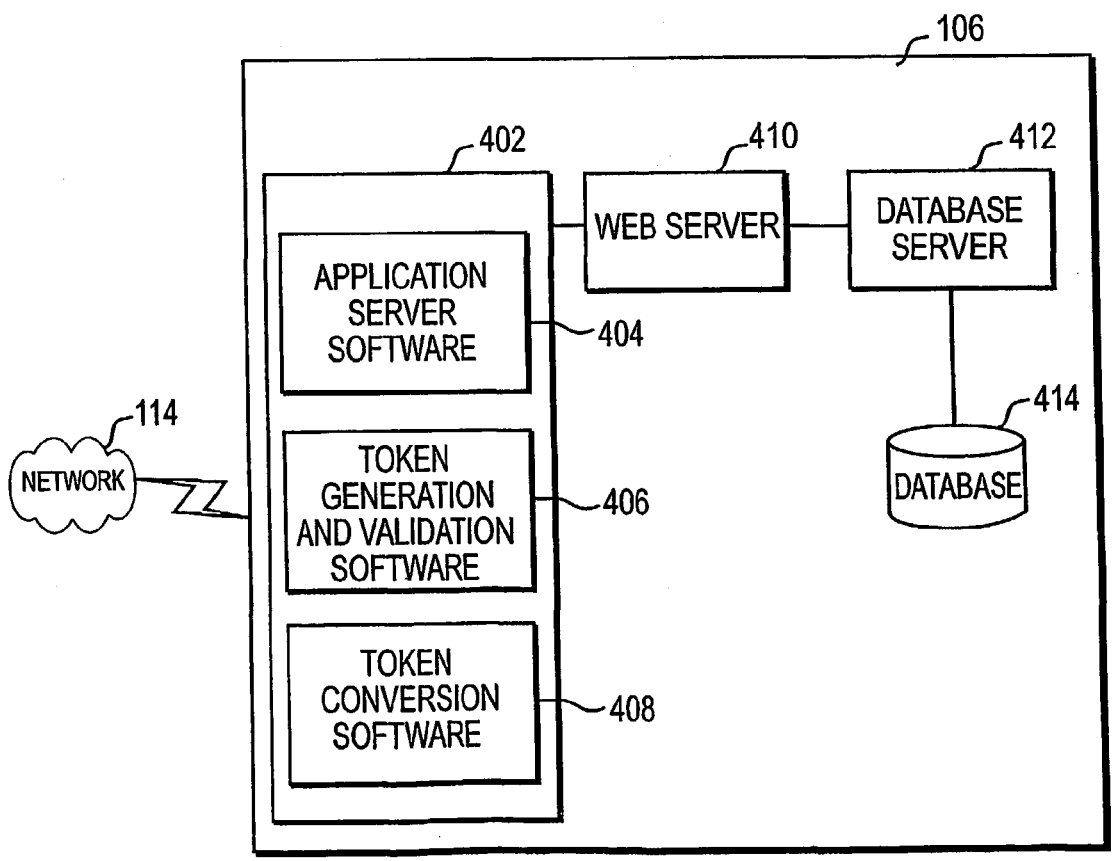
FIG. 4 is a block diagram of an exemplary shipping computer consistent with the present invention.

FIG. 4 is a block diagram of an exemplary shipping computer 106 consistent with the present invention. As shown, shipping computer 106 may include an application server 402, a web server 410, a database server 412, and a database 414.

Application server 402 may include software tools, such as application server software 404, token generation and validation software 406, and token conversion software 408, to generate dynamic content and execute applications for shipping computer 106. Application server software 404 may process logic and instructions to support shipping computer 106. For example, application server 402 may authenticate a customer when the customer desires to access his or her data or obtain an electronic token from shipping computer 106.

Token generation and validation software 406 may generate an electronic token for a customer and the token conversion software 408 may convert a token into shipping label information. Web server 410 may process HTML requests to enable communications with other computers (e.g., payment computer 108) and may provide data to application server 402 and database server 412.

Database server 412 may process all communications with a database 414. Database 414 may include customer information provided by registration system 104. Although not shown, it will be apparent to one skilled in the art that shipping computer 104 may include a processor, memory, a communications device (e.g., network interface card), an output device (e.g., monitor), input device (e.g., keyboard and pointing device), and an operating system.

Moreover, it will be apparent to one skilled in the art from the foregoing and following description that shipping computer 106 may include some or all the components shown in FIG. 4. For example, in one embodiment, shipping computer 106 may not include a database server or a database. Instead, shipping computer 106 may obtain the data from registration system 104.

Furthermore, although not shown, payment computer 108 and merchant computer 110 also may include some or all of the components that are included in shipping computer 106. For example, in one embodiment, both of these computers may include an application server to generate dynamic content and execute applications, a web server to process HTML requests, a database server, and a database. Moreover, in one embodiment, payment computer 108 may include token conversion software.

Similarly, although not shown, it will be apparent to one skilled in the art that delivery computer 112 may include some or all of the components that are included in client computer 102. In one embodiment, a shipper may use the browser on delivery computer 112 to request delivery label information from the shipping computer 106. In another embodiment, instead of a browser, delivery computer 112 may include application software for requesting delivery label information from the shipping computer 106.

Figure 5:
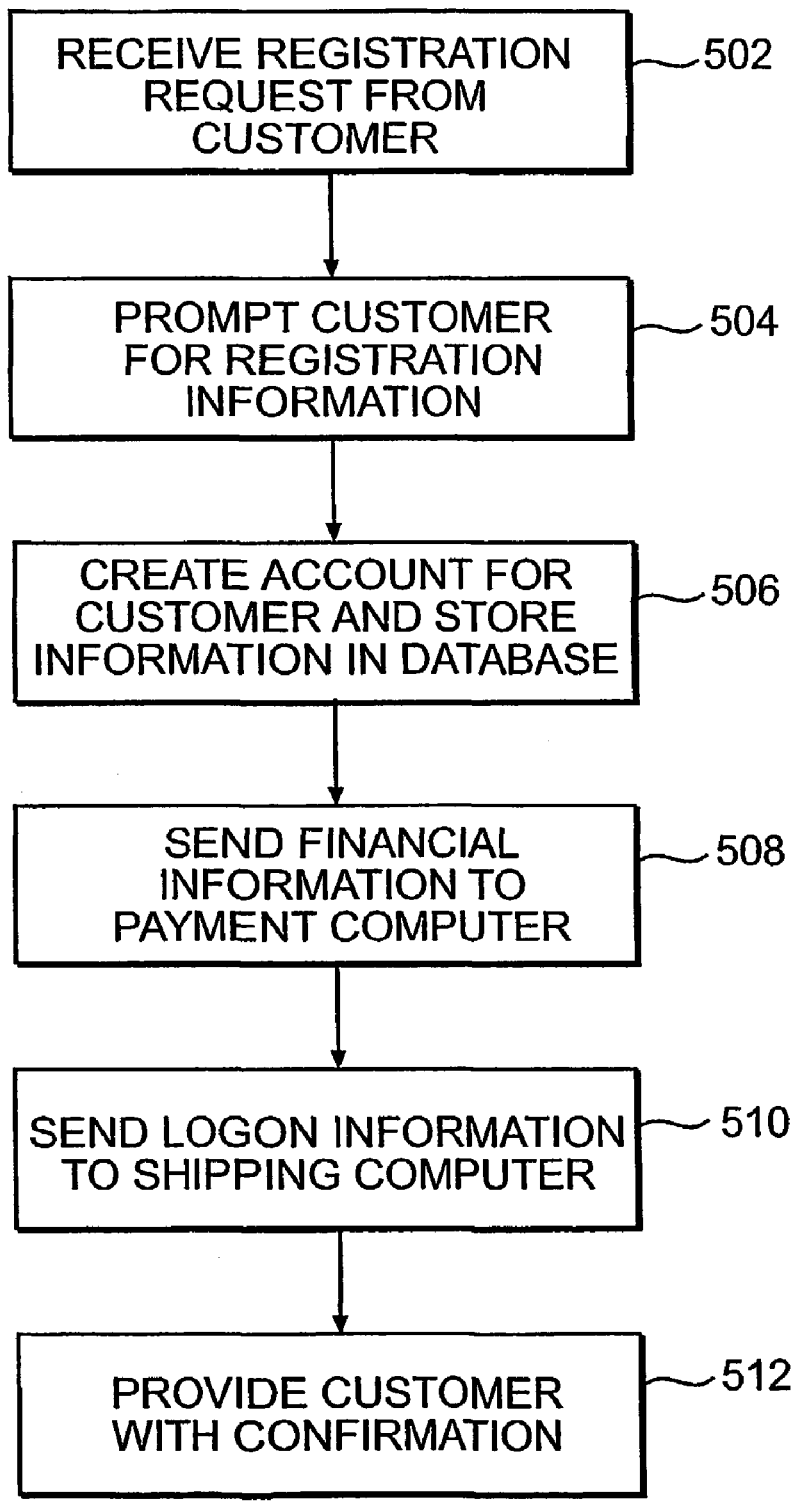
FIG. 5 is an exemplary flowchart illustrating the registration process, in accordance with methods and systems consistent with the present invention.

FIG. 5 is an exemplary flowchart illustrating the registration process, in accordance with methods and systems consistent with the present invention, such as the system illustrated in FIG. 1. A customer at a client computer 102 may connect to network 114 and request the web page associated with the registration process, for example, by entering the web page's URL in his or her browser (stage not shown in Figure). Registration system 104 may receive the request from the customer (stage 502) and may prompt the customer for registration information (stage 504). The registration information may include customer name, physical address, e-mail address, telephone number, financial information, and a request for an account.

If the customer already has an account with a payment company, then the financial information may include information regarding that account (e.g., account number). If the customer does not have an account with a payment company, the financial information may include the required information to establish an account with the payment company.

Upon receiving the requested information from the customer, registration system 104 may create an account for the customer and store the customer's information in database 308 (stage 508). During account creation, the account number generator software may generate a unique account number for the customer. In addition, in one embodiment, logon information (e.g., user name and/or password) may be created by registration system 104 so that the customer can logon to registration system 104 or shipping computer 106. In another embodiment, the customer may be prompted to select the logon information. In still another embodiment, during account creation, registration system 104 may request a digital certificate from digital certificate authority 310.

Moreover, in one embodiment, during account creation, the token generation and validation software may generate an electronic token for use by the customer during the purchasing process.

Once an account has been created, the financial information is sent to payment computer 108 and deleted from database 308 (stage 508). In another embodiment, however, the financial information may not be deleted from database 308. In this stage, the payment computer 108 also maybe provided with the shipping computer's information (e.g., IP address) so that the payment computer 108 may send token validation and conversion requests to shipping computer 106 during the purchasing process.

After account creation, registration system 104 may also send logon information to database 414 of shipping computer 106 so that the shipping computer can receive and process requests received from client computer 102 (stage 510). In one embodiment, registration system 104 may also send customer address information and account number to shipping computer 106 so that the shipping computer 106 does not have to request such information from database 308 during the shipping process.

Finally, registration system 104 may provide the customer with a confirmation indicating that the customer's account has been created successfully (stage 512). In this stage, if a digital certificate was created, the digital certificate is provided to the customer. Similarly, if the logon information was generated by registration system 104, the customer is provided with the logon information. The account establishment process is complete once the customer is provided with a confirmation.

It will be apparent to one skilled in the art that many modifications may be made to the process shown in FIG. 5 without departing from the scope of the invention. For example, registration system 104 may provide the customer with confirmation before sending customer information to payment computer 108 or shipping computer 106.

Moreover, it will be apparent to one skilled in the art that other account establishment processes may be used or that the process shown in FIG. 5 may be combined with other account establishment processes. For example, the account establishment process disclosed in the '328 application maybe used to establish an account for a customer or the process shown in FIG. 5 may be combined with the account establishment process disclosed in the '328 application.

Figure 6:
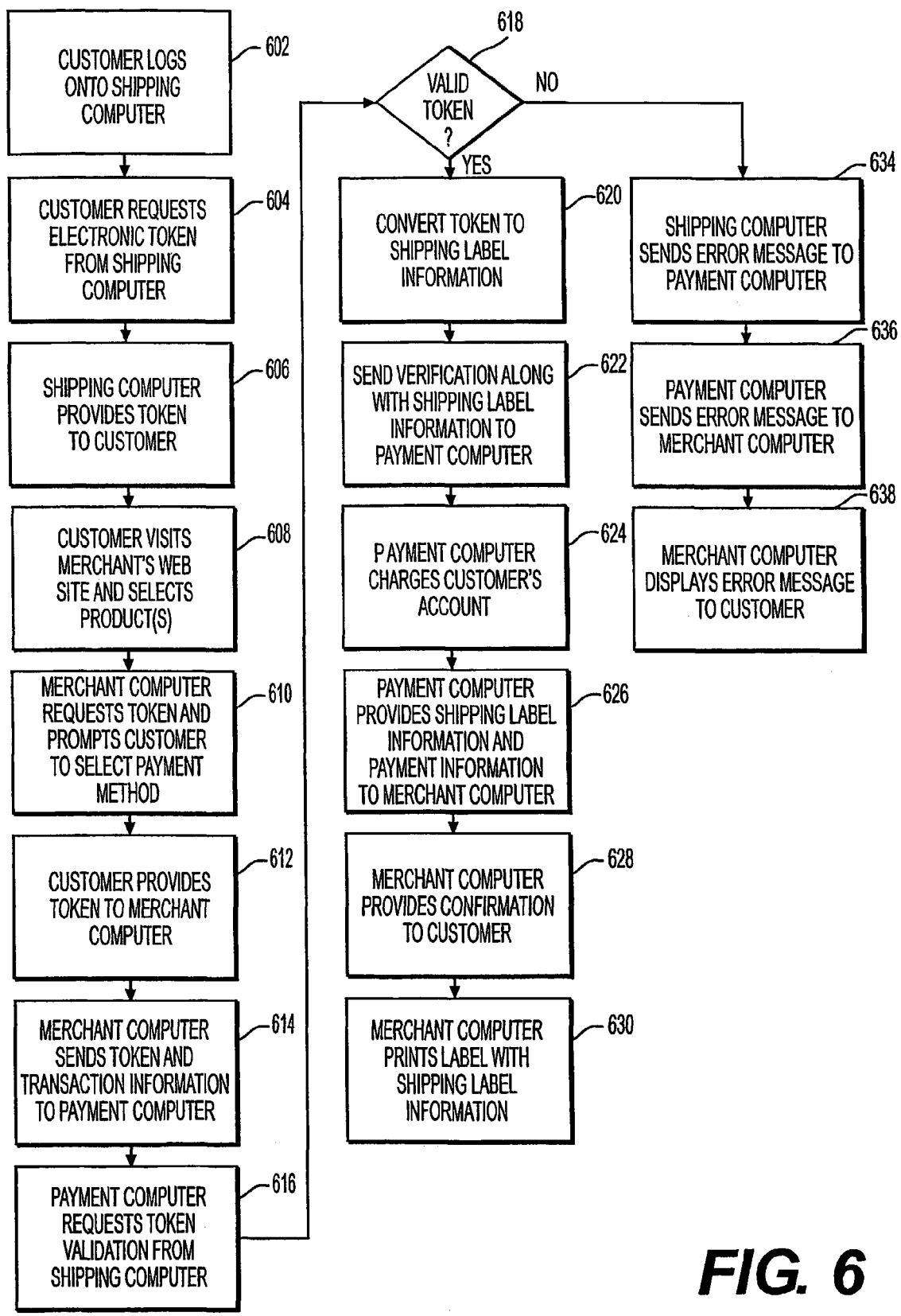
FIG. 6 is an exemplary flowchart illustrating the purchase process, in accordance with methods and systems consistent with the present invention.

Once a customer has established an account, the customer may purchase products from a merchant web site. FIG. 6 is an exemplary flowchart illustrating the purchase process, in accordance with methods and systems consistent with the present invention. A customer may use client computer 102 to connect to network 114 and logon to shipping computer 106 (stage 602). When logging onto the shipping computer 106, the shipping computer may request logon information from the customer and compare it with the information in database 414. If the logon information provided by the customer matches the one in database 414, the customer is authenticated. If the logon information, on the other hand, does not match the information in database 414, then shipping computer 106 may request the customer to reenter the logon information. The customer may be given a certain number of tries (e.g., three tries) before shipping computer 106 instructs the customer to contact the administrator of the shipping computer 106 to resolve the authentication problems.

In one embodiment, during the logon process (stage 602) the shipping computer 106 may also check the digital certificate provided to the customer during the account establishment process to authenticate the customer.

Once logged into shipping computer 106, the customer may request an electronic token from shipping computer 106 (stage 604). Token generation and validation software 406 may either generate an electronic token or request registration system 104 to generate an electronic token. The electronic token may also be stored in the customer's account.

Once the token has been generated, the token may be provided to client computer 102 (stage 606). After obtaining the token, a customer may connect to merchant computer 110, for example, by typing in the merchant's web site address in his or her computer's browser. Typing in the address should take the customer to the web site hosted by the merchant computer 110. Once at the merchant computer 110, the customer may select the product or products he or she wants to purchase (stage 608).

After selecting the products, merchant computer 110 may request the electronic token from the customer and may prompt the customer to select a payment method (stage 610). In response, the customer may provide the token to the merchant computer 110 and may select the method corresponding to the payment company that the customer wants to use (stage 612).

Next, merchant computer 110 may send the token along with the transaction information to payment computer 108 corresponding to the payment company selected by the customer (stage 614). The transaction information may include the total purchase amount and/or a description of the products the customer wants to purchase.

Payment computer 108 may in turn send the token to shipping computer 106 for validation (616). Upon receiving a validation request from payment computer 108, token generation and validation software 406 of shipping computer 106 may compare the token to the token stored in the customer's account (stage 618). If the token is encrypted, the shipping computer 106 may decrypt it before comparing it to the token stored in the customer's account.

If the token is valid, the token conversion software 408 of shipping computer 106 may convert the token into shipping label information (stage 620) and send a response to payment computer 108 (stage 622). The response may include a verification indicating that the token is a valid token and shipping label information (stage 622).

Upon receiving a verification from shipping computer 106, payment computer 108 may charge the purchase amount to the customer's account (stage 624) and may send the shipping label information along with payment confirmation information to merchant computer 110 (stage 626).

Next, merchant computer 110 may provide confirmation of the transaction to the customer (stage 628). Then, merchant computer 110 may print the shipping label information on a label (stage 630) and the merchant may affix the label on the package containing the customer's products. Finally, the merchant may send the package to the shipper (stage not shown in figure). After the package has been sent to the shipper, the purchase process is complete.

If, on the other hand, shipping computer 106 determines that the token is not valid, the token conversion software 408 of shipping computer 106 may send an error message to payment computer 108 indicating that the there was a verification error (stage 634). Payment computer 108 may in turn send the error message to merchant computer 110, which may display the message to the customer (stages 636 and 638). The customer may then either start the purchase process over again or retry depending on the preference of the merchant and/or the customer.

In the foregoing description, it was assumed that the customer conducted the purchase without closing his or her browser and thus, did not need to logon to the shipping computer 106 in stage 620. If the customer had closed the browser on client computer 102, then the customer would be requested to logon in stage 620. In another embodiment, shipping computer 106 may require the customer to provide the logon information again to provide more security. In still another embodiment, the token may be a unique token and thus the customer may not need to logon to shipping computer 106 in stage 620.

Moreover, although not shown in FIG. 6, one skilled in the art would readily understand that the customer would need to provide some identifying information to payment computer 108 so that the payment computer can charge the customer's account. In another embodiment, however, shipping computer 106 may provide the required identifying information to payment computer 108 along with the verification in stage 622.

Furthermore, it will be apparent to one skilled in the art that various modifications may be made to the process shown in FIG. 6 without departing from the scope of the invention. For example, in one embodiment, if the customer's account with the payment company is linked to a credit card, payment company 108 may send a request to the credit card company requesting that the purchase amount be charged to the customer's account in stage 624. In another embodiment, the amount that is charged to the customer's account may include the postage amount. The postage amount maybe calculated by shipping computer 106 and may be sent to payment company 108 along with the verification in stage 622. In another embodiment, payment computer 108 may convert the token to shipping label information instead of receiving such information from shipping computer 106.

Figure 7:
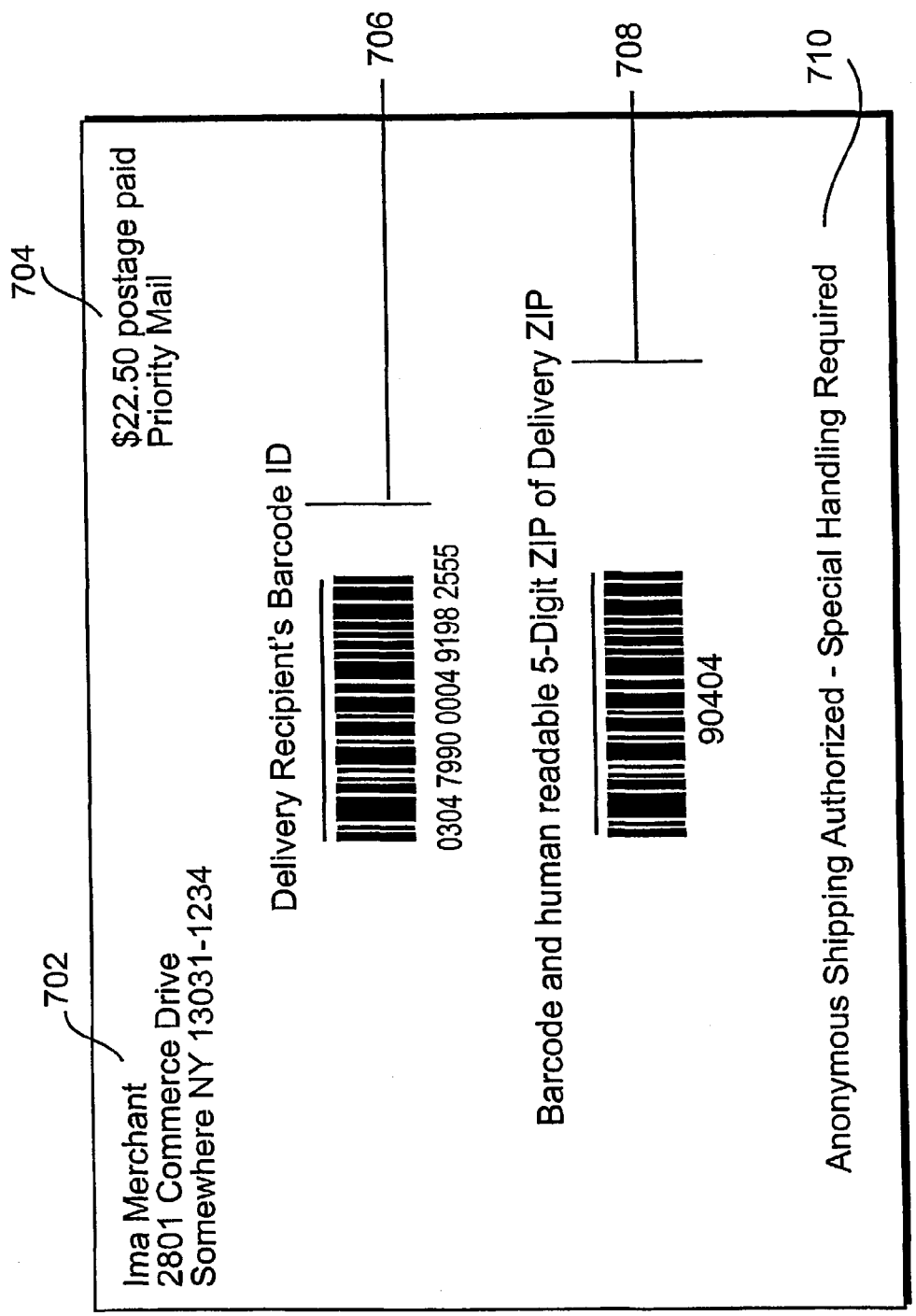
FIG. 7 is an exemplary diagram of a shipping label used by a merchant, in accordance with methods and systems consistent with the present invention.

FIG. 7 is an exemplary diagram of a shipping label used by a merchant, in accordance with methods and systems consistent with the present invention. The shipping label may include a return address 702, evidence of postage and class of service 704, shipping label information that may include a barcode 706 to identify the customer and a barcode 708 to identify the re-labeling location, both of which may be received from shipping computer 106, and an indication that the package has been authorized for anonymous shipping and requires special handling (stage 710). As shown in FIG. 7, human readable digits may be included under both the barcodes 706 and 708.

Although the label shown in FIG. 7 includes barcodes to identify the customer and re-labeling information, in another embodiment, only the customer information may be included on a shipping label.

If the shipping label has re-labeling location information on it, the shipper may send the package to the location corresponding to the re-labeling location information. For example, if the relabeling location corresponds to the customer's local post office, the shipper may send the package to the customer's local post office for relabeling. If, on the other hand, the package does not contain re-labeling location information on it, the package may be sent to a branch specified by the shipper for receiving such packages and be re-labeled by the shipper at that location.

To re-label the package, the shipper may use delivery computer 112 to read information corresponding to the customer (e.g., bar code 706), which is part of the shipping label information on the package, and send this information to shipping computer 106 along with a request to convert the information to the delivery label information. Shipping computer 106 may convert the shipping information to the delivery label information and provide the delivery computer 112 with that information. In another embodiment, shipping computer 106 may send a request to registration system 104 requesting that the shipping information be converted the delivery label information. The shipper then affixes a label with the delivery information on the package and ships the package to the customer.

Figure 8:
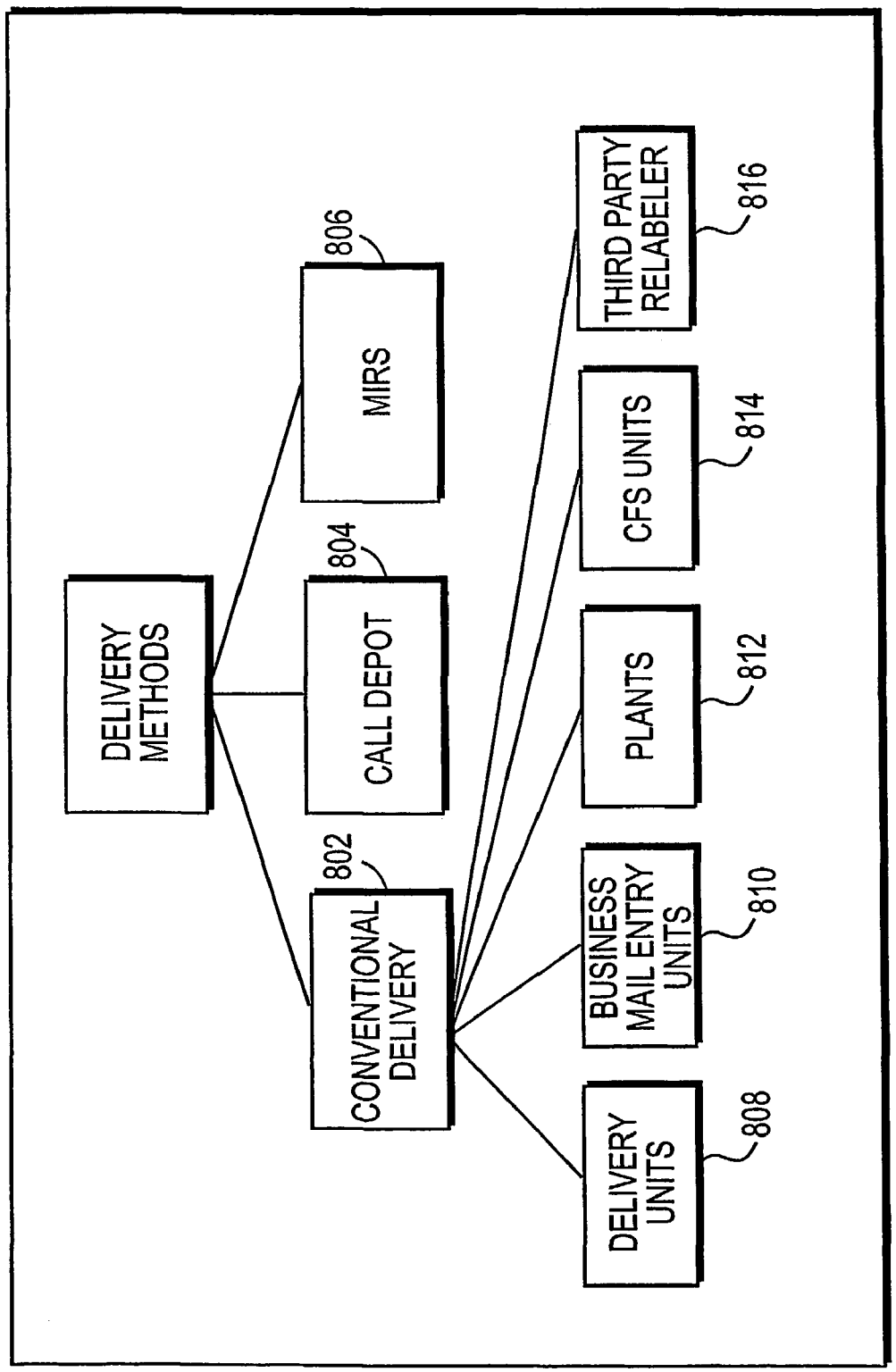
FIG. 8 is an exemplary block diagram of the various shipping methods available through USPS, in accordance with systems and methods consistent with the present invention.

Depending on the customer and/or shipper, the customer may be given the option of selecting one of many methods of delivering a package. FIG. 8 is an exemplary block diagram of the various shipping methods available through USPS, in accordance with systems and methods consistent with the present invention. As shown, a customer may select between three shipping methods: conventional delivery method 802, call depot method 804, or Mail Item Retrieval System (MIRS) 806. The customer may make such a selection, for example, in stage 612, in response to a merchant's prompt for a delivery method in stage 610.

The conventional delivery 802 method includes delivering the package the conventional way (e.g., street delivery or P.O. Box delivery). If the customer chooses the conventional delivery method, USPS may re-label the package at one of five different locations: delivery units 808, business mail entry units (BMEUs) 810, plants 812, computer forwarding service (CFS) forwarding units 814, or a third party relabeler 816. The re-labeling of the these packages at any of these five different locations may be performed, as described above.

If the customer chooses the call depot 804 method, the package would be sent to the customer's local post office or a designated post office near the delivery address. Instead of re-labeling the package in this method, the shipper would read or scan the shipping label information and mail the customer a notification indicating that USPS has received a package for the customer and that the customer may pick up the package at a designated location. The customer may then go to the designated location, present identification along with the notification to the shipper's representative, and receive the package.

Similarly, if the customer chooses the MIRS 806 method, the package would not be re-labeled, but instead the package would be sent to a MIRS location near the delivery address. Instead of re-labeling the package in this method, the shipper would read or scan the shipping label information and mail the customer a notification indicating that USPS has received a package for the customer and that the customer may pick up the package at a designated location. Since MIRS allows customer to retrieve mail items at a self-service machine, the customer may go to the self-service machine at the designated location and retrieve the package. Before retrieving the package, however, the customer may need to provide authentication information that would have been previously provided to the customer by USPS. In one embodiment, MIRS 806 method may be based on the systems and methods disclosed in related U.S. Pat. No. 6,978,929, entitled "Systems and Methods for Providing Mail Item Retrieval", issued Dec. 27, 2005, which is hereby incorporated by reference.

The above-noted features, other aspects, and principles of the present invention may be implemented in various system or network configurations to provide automated and computational tools for shipping a package privately to a customer. Such configurations and applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

The present invention also relates to computer readable media that include program instruction or program code for performing various computer-implemented operations based on the methods and processes of the invention. The media and program instructions may be those specially designed and constructed for the purposes of the invention, or they may be of the kind well-known and available to those having skill in the computer software arts. The media may take many forms including, but not limited to, non-volatile media, volatile media, and transmission media. Nonvolatile media includes, for example, optical or magnetic disks. Volatile media includes, for example, dynamic memory. Transmission media includes, for example, coaxial cables, copper wire, and fiber optics. Transmission media can also take the form of acoustic or light waves, such as those generated during radio-wave and infra-red data communications. Examples of program instructions include both machine code, such as produced by compiler, and files containing a high level code that can be executed by the computer using an interpreter.

Furthermore, it will be apparent to those skilled in the art that various modifications and variations can be made in the system and method of the present invention and in construction of this invention without departing from the scope or spirit of the invention. For example, in one embodiment, the customer may establish an account with registration system 104 and obtain an account number from the registration system 104. Upon receiving the account number, the customer may visit a merchant's web site and select the products that the customer wants to purchase. After selecting the products, the customer may provide to the merchant the account number and financial information (e.g., credit card number and expiration date). The merchant may charge the customer's credit card for the amount of the purchase and send the package to a shipper with a label that contains the customer's account number on it. Upon receiving the package, the shipper may retrieve the customer's name and address from registration system 104 by using the account number on the label, apply a new label that contains the customer's name and address to the package, and ship the package to the customer.

In another embodiment, the shipper may perform the functions of a payment company. In still another embodiment, a customer may use systems and methods consistent with the present invention to purchase a service also.

Moreover, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of sending a package to a customer while preserving customer privacy using a system that includes a merchant computer, a shipping computer, and a payment computer, comprising:

receiving, from the customer at the merchant computer, a purchase request for a product;

providing, from the customer to the merchant computer, an electronic token obtained from the shipping computer;

sending, from the merchant computer to the payment computer, the electronic token corresponding to a customer account and a purchase amount corresponding to the purchase request;

sending, from the payment computer to the shipping computer, a validation request to verify whether the electronic token is valid;

verifying, at the shipping computer, the electronic token, wherein the verification comprises at least determining whether the electronic token has expired due to being used a predetermined number of times;

converting, by the shipping computer after verification, the electronic token into shipping label information, wherein the shipping label information identifies neither a name nor a physical address of the customer;

sending, from the shipping computer to the payment computer, a verification that the token is valid and the shipping label information;

sending, from the payment computer to the merchant computer, the shipping label information;

printing, at the merchant computer, a first label with the shipping label information;

affixing the first label to the package containing the product;

sending the package to a shipper;

retrieving the name and the physical address of the customer using the shipping label information; and delivering the package to the customer.

2. The method of claim 1, further comprising affixing a second label on the package, the second label including at least one of the name and the physical address of the customer.

3. The method of claim 2, wherein delivering the package to the customer includes delivering the package to the physical address of the customer.

4. The method of claim 1, further comprising sending a notification to the customer at the physical address, the notification informing the customer of the package and specifying the location of the package.

5. The method of claim 4, wherein the delivering the package to the customer is performed by a call depot at the location identified by the notification.

6. The method of claim 4, wherein the delivering the package to the customer is performed by a self-service machine at the location identified by the notification.

7. The method of claim 1, wherein the electronic token is an encrypted data structure, a random number, or an account number corresponding to the customer.

8. The method of claim 1, wherein the shipping label information includes a re-labeling location information specifying a location where the package is to be re-labeled.

9. The method of claim 1, wherein the shipping computer compares the electronic token to a token stored in the customer's account.

10. The method of claim 1, wherein the electronic token is an encrypted data structure.

11. The method of claim 1, wherein after verification of the electronic token at the shipping computer, the method further comprises transmitting a response to the payment computer indicating whether the electronic token is valid.

12. The method of claim 8, wherein at a re-labeling location specified by the re-labeling location information, a second label is affixed to the package that includes a barcode identifying a shipping address of the customer.

* * * * *

UNITED STATES PATENT AND TRADEMARK OFFICE
CERTIFICATE OF CORRECTION

PATENT NO. : 7,295,997 B2  
APPLICATION NO. : 10/311748  
DATED : November 13, 2007  
INVENTOR(S) : Jacquelyn Estes et al.

It is certified that error appears in the above-identified patent and that said Letters Patent is hereby corrected as shown below:

On the title page, item (75), line 5, "Huntongtown," should read --Huntingtown,--.

Signed and Sealed this

Eighteenth Day of March, 2008

JON W. DUDAS  
*Director of the United States Patent and Trademark Office*